Jan. 11, 1949.  P. J. DASHER  2,458,571
RESILIENT MOUNTING FOR FLUID CONTAINERS
Filed Feb. 16, 1945
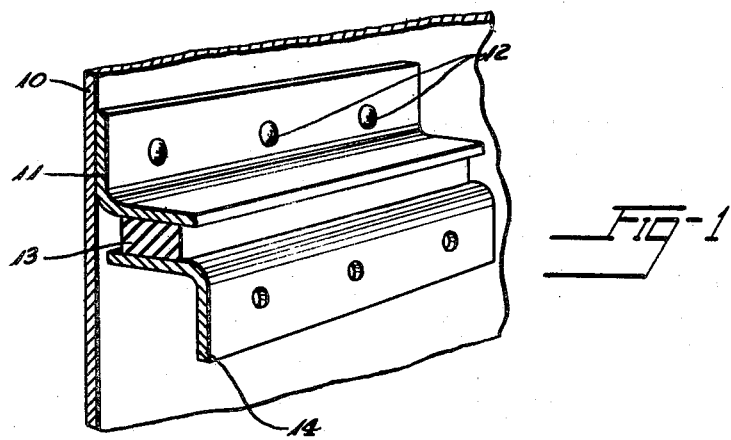
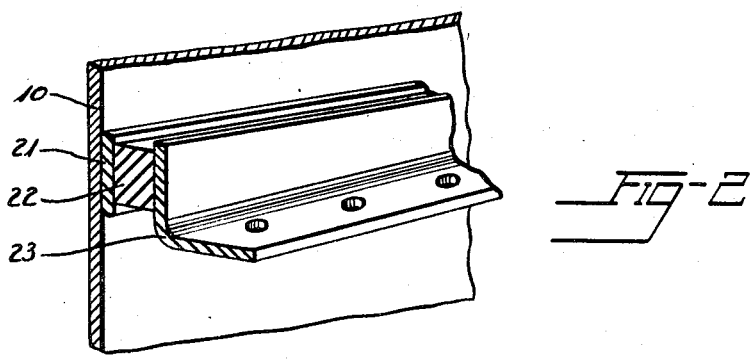
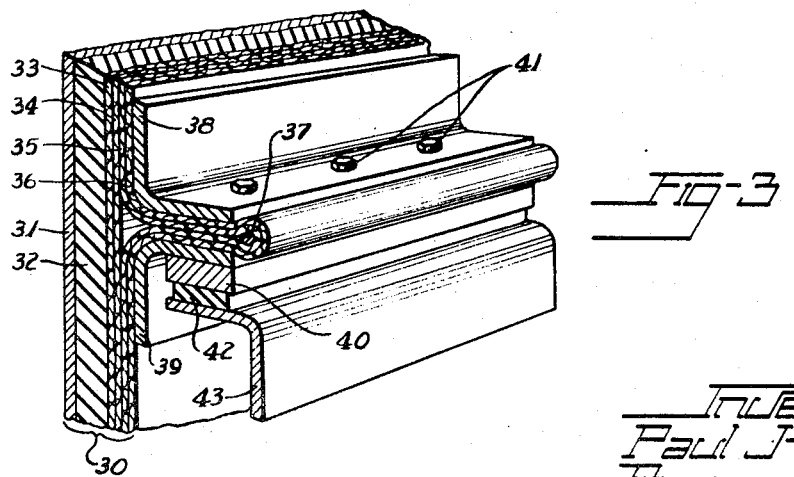
Inventor
Paul J. Dasher
By Harold S. Meyer
Atty.

Patented Jan. 11, 1949

2,458,571

UNITED STATES PATENT OFFICE 2,458,571

RESILIENT MOUNTING FOR FLUID CONTAINERS

Paul J. Dasher, Stow, Ohio, assignor to The B. F. Goodrich Company, New York, N. Y., a corporation of New York Application February 16, 1945, Serial No. 578,331

8 Claims. (Cl. 248—358)

This invention relates to a resilient mounting for fluid containers of vehicles and pertains more specifically to such a mounting for self-sealing or bullet-sealing fuel tanks used in airplanes or other military vehicles exposed to gunfire.

The principal object of the invention is to provide a mounting which will prevent transmission of the shock energy resulting from passage of a projectile through the tank to the supporting framework, thus protecting the vehicle structure from damage.

A second object is to provide a mounting in which the loading stresses are distributed equally around the periphery of the tank, thus minimizing the impairment of support of each penetration of the mounting by a projectile.

A third object is to provide a mounting which has great strength but which is light in weight.

Other objects of the invention will become apparent from the following description.

These objects are attained by providing a layer or cushion of resilient, rubber-like material placed between and fastened to the wall of the fluid container and the supporting framework of the vehicle.

Various modifications of my invention are shown in the appended drawing, in which Fig. 1 is a view in perspective cut away in section of one modification of my mounting;

Fig. 2 is a similar view of another modification; and

Fig. 3 is a similar view in which the mounting is applied to a laminated non-metallic self-sealing fuel tank, the outer plies of the tank wall being folded outwardly to act as the supporting member for the tank.

In Fig. 1, there is attached to a wall 10 of the fluid container, such as a fuel tank, an angle member 11 which may be made of metal such as iron or steel, or which may be made of any non-metallic material having the necessary properties of strength and rigidity such as wood, plywood, vulcanized fiber, hard rubber, phenol-formaldehyde resin, etc. It may be secured to the tank wall 10 by means of rivets or bolts 12 or by any suitable adhesive cement such as chlorinated rubber, rubber isomers, urea-formaldehyde resin, or the like; if both the tank wall 10 and angle iron 11 are metallic, they may be fastened together by welding. To the bottom surface of angle iron 11 is attached a thick layer of rubber-like material 13; the opposite surface of layer 13 is in turn attached to a second angle member 14, similar to the first, which is adapted to be fastened to the structural framework of the airplane or other vehicle. The layer of rubber-like material 13 should be of sufficient thickness and resiliency to support the load of the fluid container resiliently; it may be made of vulcanized natural rubber or of any material having about the same physical properties of resiliency and elasticity as vulcanized natural rubber, such as vulcanized copolymers of butadiene-1,3, with styrene, acrylonitrile, methyl acrylate, isobutylene, or the like; vulcanized polychloroprene; plasticized vinyl resins such as polyvinyl chloride, polyvinyl acetate, polyvinyl acetals, as well as copolymers of vinyl chloride or vinyl acetate or the like with each other or with vinylidene chloride, methyl acrylate, and the like; and other materials having similar physical properties. The rubber-like material may be secured or fastened to the faces of angle members 11 and 14 by means of any suitable adhesive or cement, many of which are well known to the art. If natural or synthetic rubber is employed for layer 13, and if the angle members 11 and 14 are metallic, adhesion may be obtained by plating the metal surfaces with brass and then vulcanizing the rubber in direct contact with the brass surface.

In Fig. 2 another modification of my mounting is shown which differs from the construction shown in Fig. 1 primarily in that the resilient layer in Fig. 2 is normally in a state of shear, while in Fig. 1 it is normally in a state of compression. There is attached to tank wall 10 by riveting, welding, or the like a supporting member 21, the outer face of which is parallel with that of wall 10. To the outer face of supporting member 21 is bonded a layer of rubber-like material 22 which is in turn bonded to angle member 23 which is adapted to be fastened to the structural framework of the vehicle. If desired, supporting element 21 may be omitted and the layer of rubber-like material 22 bonded directly to the wall 10. The details of construction and materials employed are the same as in the modification shown in Fig. 1.

In Fig. 3 the mounting of my invention is shown adapted to a non-metallic bullet-sealing fuel tank of the type widely used in aircraft and other military vehicles exposed to gunfire. The wall 30 of the fuel tank in this case consists of a gasoline-resistant lining 31 which may be made of gasoline-resistant synthetic rubber, such as a copolymer of butadiene with acrylonitrile, or the like; a sealing layer 32 of a rubber-like material which swells but does not dissolve in gasoline, such as slightly vulcanized soft rubber; and a plurality of layers 33, 34, 35, 36 of fabric impregnated with a resinous material such as a urea-formaldehyde or phenol-formaldehyde resin, hard rubber, or the like which is cured to a hard, rigid solid material. The outer plies 35 and 36 are folded outwardly, during the construction of the tank, around mandrel 37, and cured in that position. Vulcanized fiber angles 38 and 39 are then fitted on each side of the fold as reinforcement. A rigid plate 40, which is drilled and tapped to receive screws 41, is placed adjacent angle 39 and the whole structure is clamped together with screws 41. The plate 40 may be made of any suitable material, such as metal, wood, vulcanized fiber, synthetic resin, or the like. A layer of resilient, rubber-like material 42 is bonded to the surface of plate 40 by vulcanization or by means of a suitable adhesive; the opposite face of resilient layer 42 is bonded to supporting member 43 which is adapted to be attached to the framework of the vehicle, or which, in some cases, may be a part of the vehicle itself. In this modification, as in that shown in Fig. 1, the layer of rubber-like material is normally in a state of compression.

In practice, it has been found that when a fuel tank is pierced by a projectile a cone-shaped shock wave is set up ahead of the projectile as it passes through the liquid fuel. This shock wave causes considerable distortion of the walls of the tank over a wide area; if the tank is attached to the frame of the vehicle by any of the conventional methods hitherto employed, as for example, by metal straps or bands, the stress is transmitted to the frame and causes distortion and warping. Moreover, the great strain placed upon the mounting means used to secure the tank to the frame tends to tear the tank loose from its mountings. As a result, the usefulness of the tank may be destroyed by a single projectile, even though the tank be of the bullet-sealing type which operates to close any punctures promptly.

When my new mounting is employed, however, the energy of the projectile is absorbed temporarily by distortion of the resilient mounting instead of being transmitted to the vehicle framework, and is subsequently transferred to and dissipated by the surging liquid in the tank.

It has also been found that by extending my mounting substantially completely around the periphery of the tank, the number of direct hits upon the mounting required to impair its effectiveness is greatly increased, without undue increase in weight, as compared to a tank mounted by means of the conventional straps or bands which may be clipped in two by a single hit.

Moreover, use of my mounting with non-metallic fuel tanks provides a substantial reduction of the fire hazard as compared with the methods heretofore used for mounting such tanks. The metal straps or bands passing around and under the tank which have heretofore been used, together with the metal frame of the vehicle adjacent to the tank walls, present a relatively large area of metal in close proximity to the tank and contents. When the metal is struck by a projectile, sparks ensue causing a fire hazard. With my new mounting, however, the metal may be completely eliminated; if any metal is used, it is closely adjacent to the frame of the vehicle, so that there is little or no increase in the area of metal next to the tank which is exposed to gunfire.

Although specific embodiments of my invention have been herein described, I do not intend to limit myself solely thereto, but to include all of the obvious variations and modifications falling within the spirit and scope of the appended claims.

I claim:

1. In combination, a fluid container for attachment to a vehicle and means for supporting said container from a frame of said vehicle, said means comprising a rigid plate member attached to a wall of said container and extending outwardly therefrom, a second rigid plate member attached to a frame of said vehicle and having its surface in substantially parallel relationship with the surface of said first-mentioned plate member, and a body of rubber-like material disposed between said plate members and secured thereto, said supporting means constituting the sole support for said container.

2. In combination, a fluid container for attachment to a vehicle and means for supporting said container from a frame of said vehicle, said means comprising a rigid plate member attached to a frame of said vehicle adjacent to a wall of said container, and a body of rubber-like material disposed between said plate member and said wall and secured thereto, said supporting means constituting the sole support for said container.

3. In combination, a fluid container for attachment to a vehicle and means for supporting said container from a frame of said vehicle, said means comprising a rigid plate member attached to a wall of said container and extending outwardly therefrom in substantially perpendicular relationship thereto, a second rigid plate member adapted to be attached to a frame of said vehicle and having its surface in substantially parallel relationship with the surface of said first-mentioned plate member, and a body of rubber-like material disposed between said plate members and secured thereto, said supporting means constituting the sole support for said container.

4. In combination, a fluid container for attachment to a vehicle and means for supporting said container from a frame of said vehicle, said means comprising a rigid plate member attached to a wall of said container and extending outwardly therefrom in substantially perpendicular relationship thereto, a second rigid plate member attached to a frame of said vehicle and having its surface in substantially parallel relationship with the surface of said first-mentioned plate member, and a body of rubber-like material disposed between said plate members and secured thereto, said body of rubber-like material being so arranged as to be maintained in a state of compression by the weight of the container and its contents, said supporting means constituting the sole support for said container.

5. In a fuel tank assembly for a vehicle, a fuel container comprising a hollow body of sheet material, said material having an outwardly extending fold, and means for resiliently supporting said body from a frame of said vehicle, said supporting means comprising a body of resilient rubber-like material disposed between and secured to said fold and said frame and forming the sole connection therebetween, said supporting means constituting the sole support for said body.

6. In a fuel tank assembly for a vehicle, a fuel container comprising a hollow body of sheet material, said material having an outwardly extending fold, and means for resiliently supporting said body from a frame of said vehicle, said supporting means comprising a body of resilient rubber-like material disposed between and secured to said fold and said frame and forming the sole connection therebetween, and being so arranged as to be maintained in a state of compression by weight of said container and contents, said supporting means constituting the sole support for said body.

7. In a vehicle, a fluid container and means for supporting said container from a frame of said vehicle, said container comprising a hollow body having a wall of sheet material with an outwardly extending fold therein, said supporting means constituting the sole support for said container and comprising a body of resilient rubber-like material disposed between said fold and said frame and secured thereto.

8. In a fuel tank assembly for a vehicle, a fuel container comprising a hollow body of sheet material having an outwardly extending fold, and means for resiliently supporting said body from a frame of said vehicle, said supporting means constituting the sole support for said container and comprising a body of resilient rubber-like material disposed between and secured to said fold and said frame along the extent of said fold and forming the sole connection between said fold and said frame, said body of rubber-like material being so arranged as to be maintained in a state of compression by the weight of said container and contents.

PAUL J. DASHER.

REFERENCES CITED

The following references are of record in the file of this patent:

UNITED STATES PATENTS

| Number | Name | Date |
| --- | --- | --- |
| 297,305 | Thacher | Mar. 11, 1919 |
| 1,298,080 | Mougey et al. | Mar. 25, 1919 |
| 1,321,857 | Snell | Nov. 18, 1919 |
| 2,115,458 | Geyer | Apr. 26, 1938 |
| 2,138,175 | Keys | Nov. 29, 1938 |
| 2,257,804 | Lord | Oct. 7, 1941 |
| 2,373,221 | Blaylock et al. | Apr. 10, 1945 |
| 2,406,679 | Gray | Aug. 27, 1946 |